United States Patent
O'Neill et al.

(10) Patent No.: US 7,624,666 B1
(45) Date of Patent: Dec. 1, 2009

(54) OBSCURATION METHOD FOR REDUCING THE INFRARED SIGNATURE OF AN OBJECT

(75) Inventors: Mary Morabito O'Neill, Santa Barbara, CA (US); William H. Wellman, Santa Barbara, CA (US)

(73) Assignee: Raytheon Company, Waltham, MA (US)

(*) Notice: Subject to any disclaimer, the term of this patent is extended or adjusted under 35 U.S.C. 154(b) by 1147 days.

(21) Appl. No.: 10/615,133

(22) Filed: Jul. 8, 2003

(51) Int. Cl.
*B64D 1/18* (2006.01)
(52) U.S. Cl. ...................................... 89/1.11
(58) Field of Classification Search ............... 244/57, 244/117 A, 136; 102/334, 367; 89/1.11, 89/14.1
See application file for complete search history.

(56) References Cited

U.S. PATENT DOCUMENTS

| | | | | |
|---|---|---|---|---|
| 1,619,183 A | * | 3/1927 | Bradner et al. | 244/136 |
| 1,713,055 A | * | 5/1929 | Smith | 40/213 |
| 2,052,626 A | * | 9/1936 | Houghton, Jr. | 239/2.1 |
| 2,062,511 A | * | 12/1936 | Haddock et al. | 40/213 |
| 2,250,762 A | * | 7/1941 | Haberlin | 244/136 |
| 2,408,774 A | * | 10/1946 | Goddard et. al. | 239/171 |
| 2,476,171 A | * | 7/1949 | Williams Jr | 244/136 |
| 2,565,720 A | * | 8/1951 | Collison et. al. | 4/111.1 |
| 2,591,157 A | * | 4/1952 | Hutchinson | 40/213 |
| 2,659,556 A | * | 11/1953 | Doblhoff | 244/136 |
| 2,765,097 A | * | 10/1956 | Dobson et al. | 220/281 |
| 2,772,061 A | * | 11/1956 | Sellers | 244/136 |
| 3,208,552 A | * | 9/1965 | Seifert | 181/225 |
| 3,527,317 A | * | 9/1970 | Motsinger | 181/206 |
| 3,580,339 A | * | 5/1971 | Nance | 169/45 |
| 3,815,356 A | * | 6/1974 | Burge et al. | 60/204 |
| 3,815,360 A | * | 6/1974 | Wellinitz | 60/264 |
| 3,981,448 A | * | 9/1976 | Demogenes et al. | 239/127.3 |
| 3,992,628 A | * | 11/1976 | Karney | 250/338.1 |
| 4,002,024 A | * | 1/1977 | Nye et al. | 60/262 |
| 4,007,587 A | * | 2/1977 | Banthin et al. | 60/204 |
| 4,099,375 A | | 7/1978 | Inglee | |
| 4,100,102 A | | 7/1978 | Shaffer | |
| 4,322,035 A | * | 3/1982 | Sayles | 239/265.11 |
| 4,328,117 A | | 5/1982 | Godefroy | |
| 4,328,940 A | * | 5/1982 | Malcolm | 244/136 |
| 4,463,653 A | * | 8/1984 | Pusch et al. | 89/14.1 |
| 4,484,195 A | * | 11/1984 | Shaffer | 250/338.1 |
| 4,979,571 A | * | 12/1990 | MacDonald | 169/44 |
| 4,993,314 A | * | 2/1991 | Braden et al. | 454/1 |
| 5,269,132 A | * | 12/1993 | Loucks | 60/204 |

(Continued)

OTHER PUBLICATIONS

Giant Russian Water Ait Tanker Still Ignored by U.S. www.rense.com, Oct. 29, 2003.*

(Continued)

*Primary Examiner*—Troy Chambers
(74) *Attorney, Agent, or Firm*—Leonard A. Alkov

(57) ABSTRACT

An object such as an aircraft in flight is obscured from infrared detection when viewed from an external viewing location. The method includes providing the object having an externally viewable hot region associated therewith, wherein the hot region has a temperature greater than 150° C. A source of an obscuring agent is provided, wherein the obscuring agent comprises a mixture of carbon dioxide gas and water vapor. The obscuring agent is ejected from a dispensing location so as to flow between the hot region and the external viewing location. The obscuring agent has a temperature of less than that of the hot region.

29 Claims, 2 Drawing Sheets

U.S. PATENT DOCUMENTS

| | | | | |
|---|---|---|---|---|
| 5,340,395 | A | * | 8/1994 | Larmignat et al. ............ 516/1 |
| 5,418,366 | A | * | 5/1995 | Rubin et al. ............. 250/338.5 |
| 5,428,954 | A | * | 7/1995 | Cowan, Sr. ................. 60/262 |
| 5,484,105 | A | * | 1/1996 | Ausdenmoore et al. .. 239/127.3 |
| 5,549,259 | A | * | 8/1996 | Herlik ....................... 244/136 |
| 5,588,303 | A | * | 12/1996 | Parks .......................... 62/171 |
| 6,098,402 | A | | 8/2000 | Sawruk |
| 6,352,031 | B1 | | 3/2002 | Barbaccia |
| 6,373,058 | B1 | | 4/2002 | McKinney et al. |
| 2002/0084383 | A1 | * | 7/2002 | Maeda ....................... 244/136 |
| 2004/0045271 | A1 | * | 3/2004 | Horner ....................... 60/39.5 |
| 2005/0017131 | A1 | * | 1/2005 | Hale et al. ................. 244/136 |

OTHER PUBLICATIONS http:www.encyclopedia.laborlawtalk.com/Jet_engine, Jet engine-definition of a Jet egnine in Encyclopedia, Jun. 12, 2005.* http://science.ksc.nasa.gov/shuttle/technology/s..., Solid Rocket Boosters, Nov. 10, 2000.* http://www.chemistrydaily.com/chemistry/Space_shuttle_main_engine, Space shuttle main engine, Jun. 12, 2005.* http://www.howstuffworks.com/space-shuttle2..., How Space Shuttles Work, Apr. 25, 2003.* http://www.biography.ms/Space_shuttle_main_engine.html, Space shuttle main engine, Jun. 12, 2005.* http://earthobservatory.nasa.gov/Newsroom/view.php?id=23333, retrieved Mar. 2, 2009.* http://news.bbc.co.uk/2/hi/uk_news/magazine/4130980.stm, retrieved Mar. 2, 2009.*

* cited by examiner

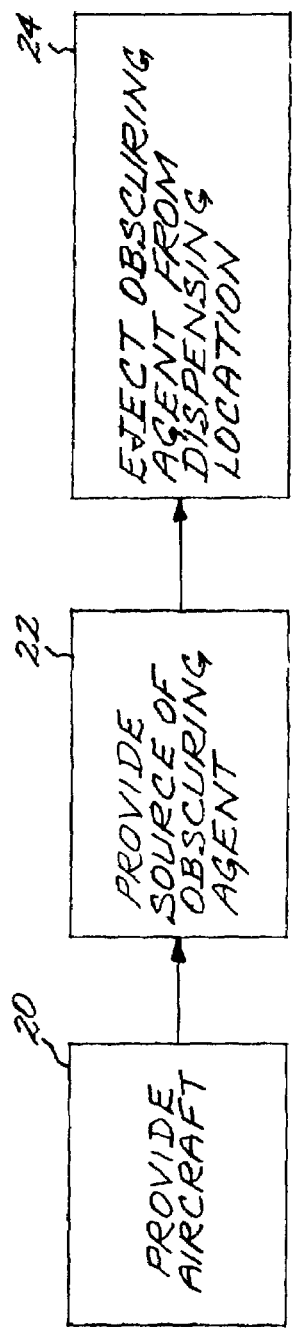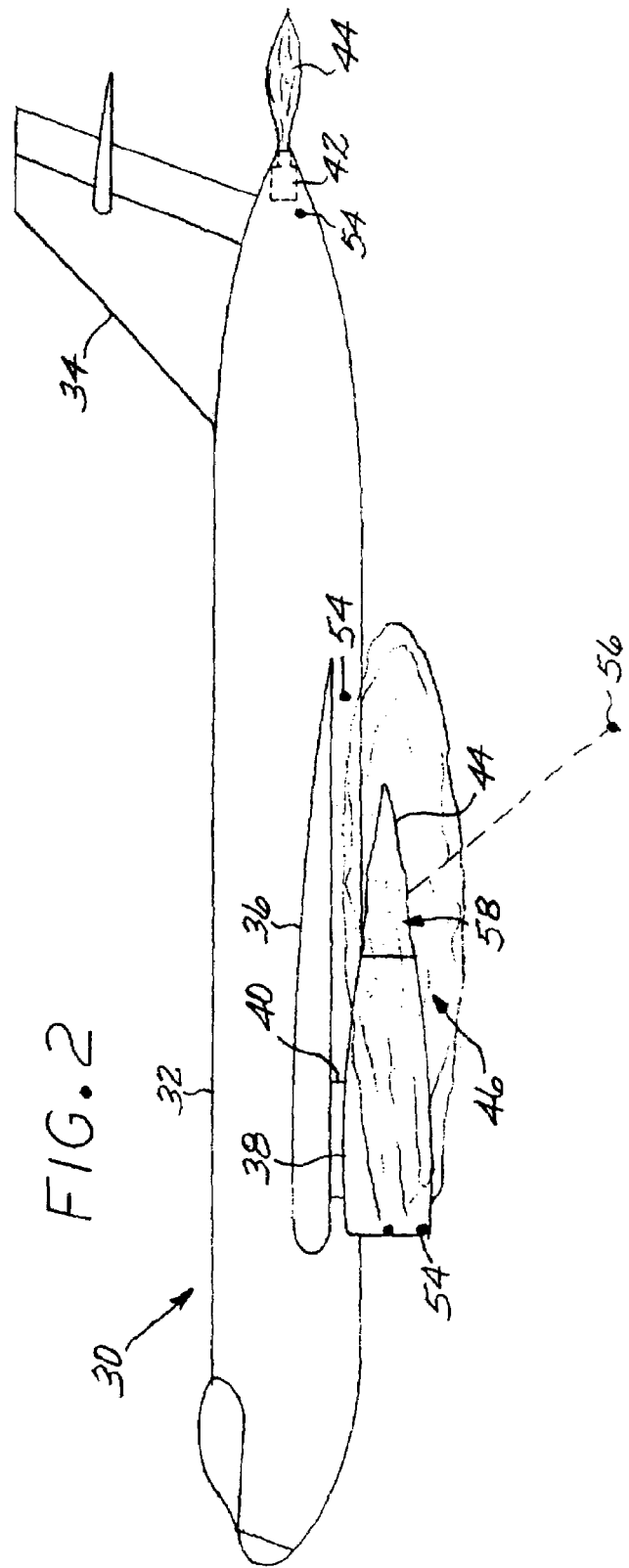

OBSCURATION METHOD FOR REDUCING THE INFRARED SIGNATURE OF AN OBJECT

This invention relates to the reduction of the infrared signature of an object and, more particularly, to the obscuring of the object relative to wavelengths of light in the infrared.

BACKGROUND OF THE INVENTION

The worldwide increase in terrorist activity has required consideration of a range of possible targets, and methods to reduce the likelihood of success of terrorist attacks on the targets. One terrorist-attack scenario is an attack on an aircraft or other object by an infrared-guided missile. Man-portable infrared-guided missile systems are widely available throughout the world, at relatively low cost. In such an attack, the seeker of the guidance system of the missile acquires a heat source of the aircraft, typically associated with the main propulsion engines. The missile is fired and guided to the target by the large infrared signature of the heat source.

An aircraft is particularly vulnerable to such an attack during takeoff and landing, when it is flying at low altitude and relatively slowly. The area within the airport security perimeter of an airport is usually secure. However, a terrorist may fire an infrared-guided missile at the aircraft from a hidden location several miles outside the airport security perimeter but near the takeoff flight path or the landing glide path. The seeker of the missile is typically sufficiently sensitive that it can acquire and home on the aircraft heat source from such distances. It is difficult for the aircraft to identify the missile threat, even if the aircraft has an infrared-source detector on board. There are many other infrared sources, such as factories and fires, present and visible during the low-level flight of takeoff and landing. Additionally, it is difficult for the aircraft to take evasive action when it is flying at low altitude and slowly, as occurs during takeoff and landing.

To protect against such attacks, either in low-level or high-level flight, many military aircraft carry flares that may be deployed if an infrared threat is sensed. The deployed flares create an alternative target to draw the attention of the seeker away from the aircraft. The use of flares for civilian aircraft such as commercial transport aircraft is not generally feasible for at least three reasons. First, the flares are normally deployed only when a threat is sensed. The aircraft therefore must carry an infrared threat warning system, which is expensive and not always reliable in situations where there are many nearby heat sources. Second, civilian aircraft typically operate from airports that are much less controlled than are military airfields, and are therefore at greater risk from terrorist attack, requiring a heavy use of flares. Third, the use of countermeasures such as flares on a widespread scale is not socially acceptable for most civilian locations such as airports in and near large cities, because the flares draw too much attention of persons on the ground and because of the debris of the flares.

There is a need for an approach for protecting objects such as civilian aircraft from attack by infrared-guided missiles. Similar needs exist for other types of objects as well. The present invention fulfills this need, and further provides related advantages.

SUMMARY OF THE INVENTION

The present invention provides an approach for reducing the infrared signature of an object such as an aircraft, when viewed from an external viewing location. The infrared signature is the infrared characteristic of the object that provides the infrared aiming point for a missile, so that the reduction of the infrared signature reduces the ability of an infrared-guided missile to acquire and then track the object based upon its infrared signature. The present approach may be used at any time, but its use is of particular value when the object is an aircraft in its takeoff or landing phases of flight. The present approach does not require the use of socially unacceptable chemicals or devices that may be objectionable when used over and in civilian communities.

In accordance with the invention, a method for obscuring an aircraft from infrared detection from an external viewing location includes providing the aircraft in flight having an externally viewable hot region associated therewith. The aircraft may be of any type, with a civilian or military transport aircraft being an example. The hot region has a temperature greater than 150° C., and typically much greater than 150° C. The method further includes providing on the aircraft a source of an obscuring agent. The obscuring agent comprises carbon dioxide gas, or water vapor, or a mixture thereof. The obscuring agent is ejected from a dispensing location on the aircraft so as to flow between the hot region and the external viewing location. The obscuring agent has a temperature of less than that of the hot region. In a typical case, the obscuring agent is ejected at a temperature of less than 150° C., so that it does not itself serve as a significant infrared emitter.

The hot region may be a structural portion of the aircraft, such as the exhaust nozzle of a gas turbine engine. The hot region may instead be a plume of hot gas flowing from the aircraft, such as the exhaust gas stream of one of the engines on the aircraft.

The source of the obscuring agent may comprise a supply of the obscuring agent carried on board the aircraft, as in tanks, or obscuring agent generated on board the aircraft by the normal operation of the aircraft or by a gas generator especially for the obscuring function. For example, the obscuring agent may comprise a portion of the exhaust gas of a gas generating engine on the aircraft, such as a main propulsion engine of the aircraft. The step of ejecting may include ejecting the obscuring agent so as to obscure a portion of an exhaust gas of a gas-generating engine of the aircraft, and in a case of interest ejecting the obscuring agent so as to obscure a portion of an exhaust gas of a main propulsion engine of the aircraft.

The obscuring agent includes carbon dioxide gas and/or water vapor and/or mixtures thereof. Carbon dioxide gas and water vapor are effective infrared emitters when they are hot, and these hot gases are two of the main sources of the infrared signature of the aircraft when flowing as combustion products from the engines of the aircraft. Carbon dioxide gas and water vapor are likewise effective absorbers of infrared energy in the infrared spectral regions of most interest when they are cool.

The obscuring agent may also include solid-material particles, such as solid metal particles. Such particles may also aid in absorbing infrared energy to obscure infrared sources.

The present approach places the obscuring agent in the line of sight between the external viewing location and the source of the infrared energy on the aircraft. The obscuring agent thereby absorbs infrared energy that would otherwise reach the external viewing location and serve as the infrared signature which a missile seeker may use to acquire and home in on the aircraft. The obscuring agent does not act in the manner of a quench to cool the infrared source. For example, it has been previously proposed to add water or other coolant to the combustion gas stream of a gas turbine engine before it flows out of the engine as the exhaust gas stream. This approach reduces the thermodynamic efficiency of the engine and requires such a large amount of coolant that the aircraft operation may be economically infeasible. The obscuring agent instead acts to block the infrared energy in the line of sight between its source and the external viewing location.

The present approach requires the judicious selection of the dispensing location(s) on the aircraft. The present invention does not seek to select those dispensing locations in detail, but some general principles may be set forth here. It is important to concentrate the obscuring agent in the lines of sight from the source of the infrared energy on the aircraft to the most-probable external viewing locations characterizing the areas of the greatest threat, because the beneficial effect of the obscuring agent increases as its concentration in the line of sight increases.

There is no need to provide obscuration of many parts of the aircraft, such as those that are at less than 150° C., which are so cool that they do not serve as significant infrared sources. The dispensing locations need not be positioned to obscure such cool-operating locations on the aircraft. The most significant infrared source on the aircraft is its engines, both the main propulsion engines and any auxiliary engines such as the auxiliary power unit, which emit hot exhaust gas. The hot carbon dioxide and water vapor in the hot exhaust gas, as well as the hot engine surfaces, are primary sources of the infrared signature of the aircraft, for example. The present approach will normally be applied to obscure the infrared emissions of the engines and their hot exhaust plumes. This may be done by dispensing the obscuring agent from dispensing locations just ahead of the hot surfaces and exhaust plumes of the engines, so that the obscuring agent flows between the hot surfaces and the exhaust plumes, on the one hand, and the most likely external viewing locations, on the other. The present approach allows the obscuring agent to be dispensed to obscure any other infrared sources on the aircraft that may also be present.

Another consideration of the dispensing location is the location of the most-probable external viewing locations. The infrared missile threats are most likely to come from below the aircraft in the takeoff/landing scenario of most interest, including locations in front of, laterally to, and behind the aircraft. The external viewing location of the threat is unlikely to be above the aircraft. The dispensing locations can therefore be tailored to provide the greatest obscuration below the aircraft, to its front, sides, and rear.

The invention has been described in relation to its preferred application, the protection of aircraft. It may also be applied in a similar manner to reduce the infrared signature of, and thereby protect, other objects. In accordance with this aspect of the invention, a method for obscuring an object from infrared detection from an external viewing location comprises providing the object having an externally viewable hot region associated therewith, wherein the hot region has a temperature greater than 150° C. A source of an obscuring agent is provided. The obscuring agent includes carbon dioxide gas, or water vapor, or mixtures thereof. The method further includes ejecting the obscuring agent from a dispensing location so as to flow between the hot region and the external view location. The obscuring agent has a temperature of less than that of the hot region. Other compatible features as discussed herein may be used with this embodiment.

The present approach has the advantage that it may be used continuously, without regard to whether there has been an infrared threat warning. Infrared threat-warning devices are therefore not required on the aircraft. The present approach uses carbon dioxide gas and/or water vapor as the primary components of the obscuring agent. These compounds are produced by normal combustion. They may be provided by the combustion in the aircraft engine, or by separate sources such as tanks or other internal sources within the aircraft, or by gas generators.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block flow diagram of a preferred approach for practicing an embodiment of the present method;

FIG. 2 is a side elevational view of an aircraft that utilizes the present approach;

DETAILED DESCRIPTION OF THE INVENTION

Figure 3:
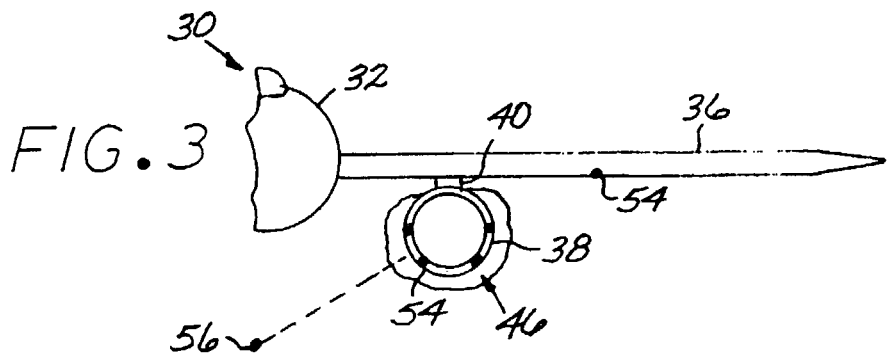
FIG. 3 is a front elevational view of a detail of the aircraft of FIG. 2, showing the engine region.

FIG. 1 depicts a preferred approach for practicing the method for obscuring an aircraft from infrared detection from an external viewing location, and FIGS. 2-3 show an aircraft 30 with which the present approach is preferably used. The aircraft 30 in flight is provided, step 20. The aircraft 30 flies from right to left in the views of FIGS. 2, 4, and 5. The aircraft 30 may be of any type, but the present approach is described in relation to a preferred civilian or military transport aircraft that typically would not carry flares or have an active infrared threat warning system. The present approach is not limited to use with aircraft 30 or to aircraft of any specific type, but is more generally applicable to other types of objects that may be the target of infrared threats.

The depicted aircraft 30 is conventional in design, with a fuselage 32, a tail 34, and a wing 36, except for the obscuring features described herein. The aircraft 30 is powered by one or more main propulsion engines 38, in this case each illustrated as suspended below the wing 36 on a pylon 40. The aircraft 30 also has at least one other engine on board, an auxiliary power unit 42, in this case located in the tail of the aircraft. Both the main propulsion engines 38 and the auxiliary power unit 42 have hot structure such as hot aft surfaces, and also produce hot exhaust plumes 44.

The aircraft 30 has an externally viewable hot region 58 associated therewith. The hot region 58 may be of any type, as long as the temperature of the hot region 58 is greater than 150° C., and typically much greater than 150° C. Lesser temperatures are not sufficient to provide effective infrared signatures that permit acquisition and locks for most types of infrared seekers and are therefore not of concern. The hot region 58 may be a structural portion of the aircraft, such as a piece of metallic structure that is heated, or a region that is not a part of the aircraft 30 but is associated with the aircraft 30. In the illustrated case, the aft surfaces of the engines 38 and 42, and the hot exhaust plumes 44, all are typically sufficiently hot that they produce infrared energy (usually termed "infrared signature") that may be targeted by the infrared seekers of external threats such as missiles. The surfaces of the engines 38 and 42 are structural portions of the aircraft 30.

The hot exhaust plumes 44 are not a part of the aircraft 30, but they are associated with the aircraft 30 and are also hot regions 58.

A source 45 (see FIGS. 4-5) of an obscuring agent 46 is provided on the aircraft 30, step 22. The obscuring agent 46 comprises carbon dioxide gas and/or water vapor and/or a mixture thereof (and possibly other constituents as discussed subsequently). When they are hot, carbon dioxide gas and water vapor are strong infrared emitters in the 2-5 micron (micrometer) wavelength infrared range, as well as in other spectral ranges. Carbon dioxide gas and water vapor are produced as products of the combustion of fuel in the engines 38 and 42, and are emitted hot from the engines as part of the hot exhaust plumes 44. The portion of the exhaust plumes 44 near the aircraft therefore comprise a major part of the infrared signature of the aircraft 30.

Figure 4:
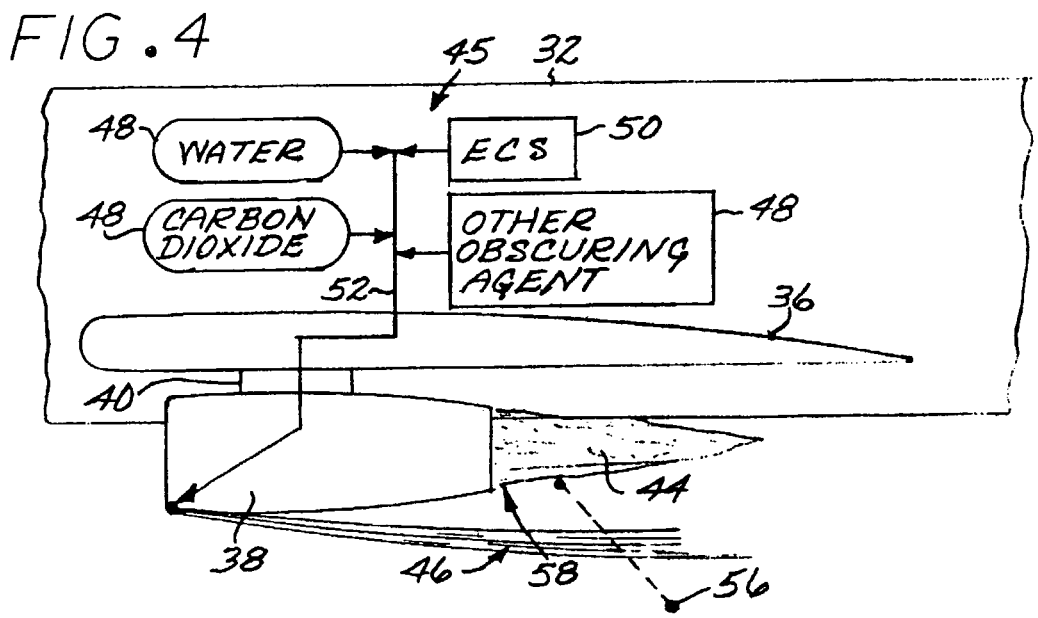
FIG. 4 is a schematic diagram of a first approach for providing and dispensing the obscuring agent.

When cool, carbon dioxide gas and water vapor are strong infrared absorbers in these same wavelength ranges. Accordingly, the present approach utilizes these readily available compounds, at a relatively cool temperature, and which are present in any event in the combustion gas and hot exhaust plumes 44 of the aircraft, to obscure in the infrared range the hot surfaces such as the hot tail pipe of the engine, and portions of the hot exhaust plumes 44 of the aircraft 30. Both carbon dioxide and water disperse in the atmosphere, are largely invisible to the human eye in the amounts used here, and do not deposit onto the earth below the flight path. Both carbon dioxide and water are safe to handle, are not fire risks, are not explosive risks that would require special security precautions on the aircraft or at airports, and are inexpensive (or free, if combustion products are used). Water vapor and carbon dioxide are natural atmospheric components that are non-poisonous. Additionally, water vapor is environmentally friendly and non-polluting. Carbon dioxide is produced by the aircraft engines 38 and 42 in any event, and its use adds nothing to the smog content in the embodiment discussed in relation to FIG. 5. The carbon dioxide used in the embodiment of FIG. 4 is the by-product of other chemical reactions, such as the production of ethane. The use of these constituents in the obscuring agent 46 is therefore generally socially acceptable.

Other constituents may be added to the obscuring agent 46 to achieve more obscuring power and/or to tailor the wavelength range of the infrared absorption. Other cool infrared absorbing gaseous constituents, such as carbon monoxide, ozone, nitrous oxide, and methane, may be present in the obscuring agent 46. Particles of finely divided solid infrared absorbing constituents may be present in the obscuring agent 46. The finely divided particles are preferably present in a particulate diameter of about that of the wavelength of the infrared light to be obscured or larger, so typically in the size range of about 2-5 micrometers or larger. A range of particle sizes may be used. Examples of solid infrared absorbers that may be used include, for example, small metal particles such as iron particles and/or aluminum particles, and small non-metallic particles such as small ceramic particles or small paper particles. The use of solid particles has the advantage that, generally, they have more infrared absorbing power per pound of weight than do the gaseous infrared absorbers. They have the disadvantages that they are not available in the combustion gas and must be carried on board the aircraft 30, and they do not disperse in the atmosphere and instead eventually deposit on the earth below the flight path or are carried on the wind to nearby areas. In some instances the deposition of the particles may be socially unacceptable. In other instances, such as for flight paths that are over water, there is less concern, particularly where the particulate material is environmentally benign. The dispensing of the solid particles also requires a more-complex dispensing system than does a gas. The solid particles may be used in some situations and not others, such as some airports and conditions of recognized higher risk of infrared-guided threats. The use of the solid particles in the obscuring agent 46 therefore requires a careful consideration of the benefits and potential adverse effects of their use for each situation.

The obscuring agent 46 is thereafter ejected, step 24, from one or more dispensing locations 54 on the aircraft 30 so as to flow between the respective hot regions 58 and the external viewing locations 56. The obscuring agent 46 has a temperature of less than that of the hot region 58 as it flows between the respective hot regions 58 and the external viewing locations 56. Preferably, the obscuring agent 46 is ejected at a temperature of less than about 150° C. At this temperature, it is below a temperature at which the obscuring agent 46 itself could serve as an infrared emission source for available infrared seekers.

The amount of obscuring agent to be ejected to some extent determines the effectiveness of the obscuring of the heat source in the hot region 58, but is limited by the amount of obscuring agent that is available and may be channeled to the dispensing locations 54. Preferably, the amount of the obscuring agent is sufficient to reduce the infrared signature along the line of sight 56 to a sufficiently low level that it cannot serve as the basis for the acquisition and lock-on of an infrared sensor. The amount of obscuring agent is preferably determined for each individual heat-source, because in most cases there will be little beneficial cross obscuring effect of the obscuring agent ejected near one hot region 58, relative to another hot region 58. To achieve this degree of obscuring, the amount of obscuring agent is preferably at least 4 pounds per second, more preferably at least about 7 pounds per second, and most preferably at least about 12 pounds per second for carbon dioxide per 100 watts per steradian of infrared energy produced by the hot region 58; and at least 4 pounds per second, more preferably at least about 7 pounds per second, and most preferably at least about 12 pounds per second for water, per 100 watts per steradian of infrared energy produced by the hot region 58. If lesser amounts are used, some obscuring occurs, but it is less than acceptable for most types of infrared-seeking sensors. This normalization scales the approach for the amount of heat output from each hot region 58, because a smaller engine produces less heat signature than does a larger engine. An amount of 4 pounds per second corresponds to about 10 percent of the output of a conventional gas turbine engine used on a moderately size commercial transport aircraft.

Figure 5:
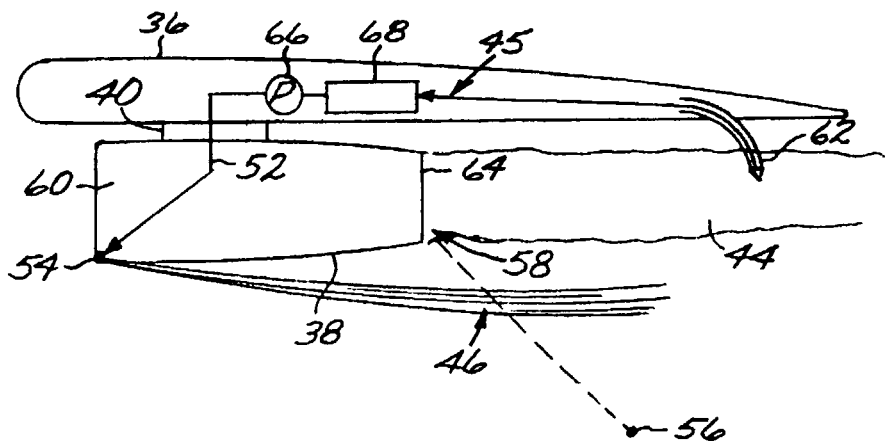
FIG. 5 is a schematic diagram of a second approach for providing and dispensing the obscuring agent.

The source of the obscuring agent may be of any operable type. Examples include obscuring agent stored on board the aircraft, obscuring agent generated on board the aircraft by the engines of the aircraft, and obscuring agent generated on board the aircraft by a gas generator separate from the engines of the aircraft. FIGS. 4-5 illustrate two preferred approaches for implementing the source 45 of the obscuring agent 46. In the approach of FIG. 4, all of the obscuring agents 46 are carried on-board the aircraft 30. For example, water, carbon dioxide, and other obscuring agents may be carried in appropriate containers 48. Water and carbon dioxide may also be collected from the environmental control system (ECS) 50 of the aircraft, as they are both naturally present in the cabin of passenger aircraft. The obscuring agents 46 are transferred by one or more transfer lines 52 to the various dispensing locations 54. Because the engines 38 and 42 are notable sources of infrared emissions, both on their externally visible hot structural surfaces and in their exhaust plumes 44, dispensing locations 54 are present such that the plume of obscuring agent 46 ejected from the dispensing locations 54 serves to obscure the views from front, side, and rear external viewing locations 56 of these hot regions 58 on and trailing behind the aircraft 30.

At least some of the dispensing locations 54 are therefore selected to be just ahead of the hot regions 58 associated with the engines 38 and 42 and their exhaust plumes 44, so that the dispensed obscuring agent 46 flows rearwardly in the slip stream of the aircraft 30 to obscure these hot regions 58 during flight of the aircraft 30. That is, the obscuring agent 46 flows between the hot regions 58 and the external viewing locations 56. A convenient position for the dispensing locations 54 for the main propulsion engines 38 is on the engine nacelle 60 forward of the aft end of the engines 38, on the wings 36, and on the fuselage 32 just ahead of the auxiliary power unit 42. Because the external viewing locations 56 are normally below the aircraft 30, the dispensing locations 54 for the main propulsion engines 38 may be concentrated so as to distribute the greatest amount of the obscuring agent 46 to obscure lines of sight to external viewing locations 56 which are below, and also in front of, on the sides of, and behind the aircraft 30. Specific positioning of the dispensing locations 54 are calculated according to the aerodynamics and gas flow dynamics for specific aircraft and engine configurations.

In the approach of FIG. 5, some or all of the obscuring agents 46 are gathered from the hot exhaust plume 44, which contains substantial amounts of carbon dioxide gas and water vapor. An intake 62 extends into the hot exhaust plume 44, typically at a location about 20 feet rearward from an aft end 64 of the engine 38. At this point, the gases in the hot exhaust plume 44 have naturally cooled from their high temperatures when flowing from the aft end 64 of the engine 38. The gases gathered at the intake 62 flow through the transfer lines 52 to the dispensing locations 54. A pump 66 may be provided to assist in drawing gas from the hot exhaust plume 44 and forcing it through the transfer lines 52. A cooler 68, comparable in function to a radiator or a heat sink, may be provided to cool the gas flowing through the transfer lines 52, if it has not cooled sufficiently by natural heat loss by the time it reaches the dispensing locations 54.

The two approaches of FIGS. 4-5 may be combined in practice, with some of the obscuring agent 46 being collected from the engine exhaust and some from on-board containers 48 or collected from the ECS 50. For example, solid particulate would be carried on-board the aircraft and dispensed as in FIG. 4, while significant amounts of carbon dioxide gas and water vapor would preferably be collected from the exhaust plume 44 and dispensed as in FIG. 5.

The obscuring agent 46 is dispensed in the most-probable lines of sight to the external viewing locations 56, to obscure the hot regions 58 associated with the aircraft 30. The obscuring agent 46 is not initially mixed with the hot exhaust plume 44 so as to cool the hot exhaust plume 44 to decrease its infrared emissions directly. Most aircraft use turbofan engines, and the bypass air is already mixed with the exhaust gas of the gas turbine engine core to achieve significant cooling. Any amount of cooling effect that the present approach could achieve would be relatively small in comparison. Instead, the present approach dispenses the obscuring agent 46 so as to flow between the hot exhaust plume 44 and the most-probable external viewing locations 56. There is some incidental mixing of the obscuring agent 46 with the hot exhaust plume 44 due to the vortices behind the engines, but that mixing typically occurs so far behind the aircraft 30 that the hot exhaust plume 44 has naturally cooled so that it is no longer a significant infrared emitter. The primary mechanism of the present approach is obscuring, not cooling, the infrared-emitting hot regions 58 associated with the aircraft 30.

The effectiveness of the obscuring agent 46 in reducing the apparent infrared signature of the aircraft 30 depends upon the specific infrared absorption of the constituents of the obscuring agent, and on the concentration of the obscuring agent that is in the line of sight between the respective hot region 58 and the external viewing location 56. Carbon dioxide gas, water vapor, other gases, and solid infrared absorbers have their characteristic specific infrared absorptions. The concentration of the obscuring agent represents a tradeoff between the degree to which the infrared signature must be obscured to protect the aircraft 30, and weight considerations.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for obscuring an aircraft from infrared detection from an external viewing location, comprising the steps of
    providing the aircraft in flight having an externally viewable hot region associated therewith, wherein the hot region has a temperature greater than 150° C.;
    determining an external viewing location that is associated with a threat of an attack on the aircraft;
    providing on the aircraft a source of an obscuring agent, wherein the obscuring agent comprises carbon dioxide gas, or water vapor, or a mixture thereof; and
    ejecting the obscuring agent from a dispensing location on the aircraft so as to flow between the hot region and the external viewing location, wherein the obscuring agent has a temperature of less than that of the hot region.

2. The method of claim 1, wherein the step of providing the aircraft includes the step of
    providing a transport aircraft.

3. The method of claim 1, wherein the step of providing the aircraft includes the step of
    providing the aircraft wherein the hot region is a structural portion of the aircraft.

4. The method of claim 1, wherein the step of providing the aircraft includes the step of
    providing the aircraft wherein the hot region is a plume of hot gas flowing from the aircraft.

5. The method of claim 1, wherein the step of providing on the aircraft the source of the obscuring agent includes the step of
    providing the source of the obscuring agent comprising a supply of the obscuring agent carried on board the aircraft.

6. The method of claim 1, wherein the step of providing on the aircraft the source of the obscuring agent includes the step of
    providing the source of the obscuring agent comprising a supply of the obscuring agent generated on board the aircraft.

7. The method of claim 1, wherein the step of providing on the aircraft the source of the obscuring agent includes the step of
    providing the source of the obscuring agent comprising a portion of the exhaust gas of a gas generating engine on the aircraft.

8. The method of claim 1, wherein the step of providing on the aircraft the source of the obscuring agent includes the step of providing the source of the obscuring agent as a portion of an exhaust gas of a main propulsion engine of the aircraft.

9. The method of claim 1, wherein the step of providing on the aircraft includes the step of
providing carbon dioxide gas as the obscuring agent.

10. The method of claim 1, wherein the step of providing on the aircraft includes the step of
providing water vapor as the obscuring agent.

11. The method of claim 1, wherein the step of providing on the aircraft includes the step of
providing a mixture of carbon dioxide gas and water vapor as the obscuring agent.

12. The method of claim 1, wherein the step of providing on the aircraft includes the step of
providing solid-material particles in the obscuring agent.

13. The method of claim 1, wherein the step of providing on the aircraft the source of the obscuring agent includes the step of
providing solid metal particles in the obscuring agent.

14. The method of claim 1, wherein the step of ejecting includes the step of
ejecting the obscuring agent so as to obscure a portion of an exhaust gas of an auxiliary power unit of the aircraft.

15. The method of claim 1, wherein the step of ejecting includes the step of
ejecting the obscuring agent so as to obscure a portion of an exhaust gas of a main propulsion engine of the aircraft.

16. The method of claim 1, wherein the step of ejecting includes the step of
ejecting the obscuring agent at a temperature of less than about 150° C.

17. The method of claim 1, wherein the step of providing the aircraft includes the step of
providing the aircraft that does not carry flares and does not have an active infrared threat warning system.

18. The method of claim 1, wherein the step of ejecting includes the step of
preferentially ejecting the obscuring agent to obscure most-likely lines of sight which are below, in front of, on the sides of, and behind the aircraft.

19. The method of claim 1, wherein the step of ejecting includes the step of
ejecting the obscuring agent at a rate of at least 4 pounds per second per 100 watts per steradian of infrared energy produced by the hot region.

20. The method of claim 1, wherein the step of providing the aircraft includes the step of
providing the aircraft wherein the hot region is a plume of hot gas flowing from the aircraft, and wherein the step of ejecting includes the step of
ejecting the obscuring agent so that it is not initially mixed with the plume.

21. The method of claim 1, wherein the step of determining includes the step of
determining a line of sight to a most-probable external viewing location that is associated with a threat of an attack on the aircraft.

22. The method of claim 1, wherein the step of determining includes the step of
determining a line of sight to a most-probable external viewing location that is associated with a greatest threat of an attack on the aircraft.

23. The method of claim 1, wherein the step of ejecting is performed concurrently with an attack on the aircraft from a direction of the external viewing location.

24. A method for obscuring an aircraft from infrared detection from an external viewing location, comprising the steps of
providing a transport aircraft in flight having an externally viewable hot region associated therewith, wherein the hot region has a temperature greater than 150° C.;
providing on the aircraft a source of an obscuring agent, wherein the obscuring agent comprises a mixture of carbon dioxide gas and water vapor; and
ejecting the obscuring agent from a dispensing location on the aircraft so as to flow between the hot region and the external viewing location, wherein the obscuring agent has a temperature of less than that of the hot region, and wherein the dispensing location is on an engine nacelle of the aircraft forward of an aft end of an engine contained within the nacelle, or on a wing of the aircraft, or on a fuselage of the aircraft just ahead of an auxiliary power unit.

25. The method of claim 24, wherein the step of providing on the aircraft the source of the obscuring agent includes the step of
providing an additional source of the obscuring agent as a supply of the obscuring agent carried on board the aircraft.

26. The method of claim 24, wherein the step of providing on the aircraft the source of the obscuring agent includes the step of
providing the source of the obscuring agent comprising a portion of the exhaust gas of a main propulsion engine of the aircraft.

27. The method of claim 24, wherein the step of providing on the aircraft the source of the obscuring agent includes the step of
providing the source of the obscuring agent comprising a mixture of carbon dioxide gas, water vapor, and solid-material particles.

28. The method of claim 24, wherein the step of providing on the aircraft the source of the obscuring agent includes the step of
providing the source of the obscuring agent comprising a mixture of carbon dioxide gas, water vapor, and solid metal particles.

29. A method for obscuring an aircraft from infrared detection from an external viewing location, comprising the steps of
providing the aircraft in flight having an externally viewable hot region associated therewith, wherein the hot region has a temperature greater than 150° C.;
providing a source of an obscuring agent, wherein the obscuring agent is stored on board the aircraft or generated on board the aircraft, and wherein the obscuring agent comprises carbon dioxide gas, or water vapor, or a mixture thereof; and
ejecting the obscuring agent from a dispensing location so as to flow between the hot region and the external viewing location but not to cool the hot region, wherein the obscuring agent has a temperature of less than that of the hot region, and wherein the dispensing location is on an engine nacelle of the aircraft forward of an aft end of an engine contained within the nacelle, or on a wing of the aircraft, or on a fuselage of the aircraft just ahead of an auxiliary power unit.

* * * * *